United States Patent [19]

Tabata

[11] Patent Number: 5,781,165
[45] Date of Patent: *Jul. 14, 1998

[54] IMAGE DISPLAY APPARATUS OF HEAD MOUNTED TYPE

[75] Inventor: Seiichiro Tabata, Hino, Japan

[73] Assignee: Olympus Optical Co., Ltd., Tokyo, Japan

[*] Notice: The term of this patent shall not extend beyond the expiration date of Pat. No. 5,579,026.

[21] Appl. No.: 635,193

[22] Filed: Apr. 19, 1996

Related U.S. Application Data

[63] Continuation of Ser. No. 242,605, May 13, 1994, Pat. No. 5,579,026.

[30] Foreign Application Priority Data

May 14, 1993 [JP] Japan ................................. 5-133155
Apr. 27, 1994 [JP] Japan ................................. 6-089723

[51] Int. Cl.⁶ ........................................................ G09G 5/00
[52] U.S. Cl. ................................ 345/8; 345/121; 345/127
[58] Field of Search ............................... 345/7, 8, 9, 121, 345/123, 126, 127, 143; 348/115, 53; 340/980; 359/630

[56] References Cited

U.S. PATENT DOCUMENTS

| | | | |
|---|---|---|---|
| 3,983,474 | 9/1976 | Kuipers . | |
| 4,017,858 | 4/1977 | Kuipers . | |
| 4,754,270 | 6/1988 | Murauchi | 345/143 |
| 4,878,046 | 10/1989 | Smith | 345/8 |
| 5,030,945 | 7/1991 | Yeomans | 345/121 |
| 5,153,569 | 10/1992 | Kawamura et al. | 345/8 |
| 5,209,662 | 5/1993 | Fujita et al. | 345/8 |
| 5,216,412 | 6/1993 | Gawell et al. | 345/14 |
| 5,293,187 | 3/1994 | Knapp et al. . | |
| 5,572,343 | 11/1996 | Okamura et al. | 345/8 |
| 5,579,026 | 11/1996 | Tabata | 345/8 |

FOREIGN PATENT DOCUMENTS

| | | |
|---|---|---|
| 59-218539 | 12/1984 | Japan . |
| 3188777 | 8/1991 | Japan . |
| 4262789A | 1/1992 | Japan . |
| 4168487 | 6/1992 | Japan . |

*Primary Examiner*—Regina Liang
*Attorney, Agent, or Firm*—Stevens, Davis, Miller & Mosher, L.L.P.

[57] ABSTRACT

An image display apparatus of head mounted type includes first and second liquid crystal display panels for displaying first and second images to be observed by right and left eyes, respectively of a user wearing the image display apparatus, an optical system for forming virtual images of the displayed first and second images such that the virtual images can be seen by the user, a controller for controlling electronically at least one of position, posture, size and shape of the first and second displayed images. The first and second images are smaller than display areas of the first and second liquid crystal display panels. In one embodiment, the controller includes a button for moving horizontally and vertically the displayed images on the display panels and a button for rotating the displayed images. In another embodiment, the controller includes a detector for detecting rotation and/or position of the apparatus and the displayed images are shifted and rotated and size or shape of the displayed images is changed such that the virtual images are seen to be stationary in a virtual image plane.

10 Claims, 15 Drawing Sheets

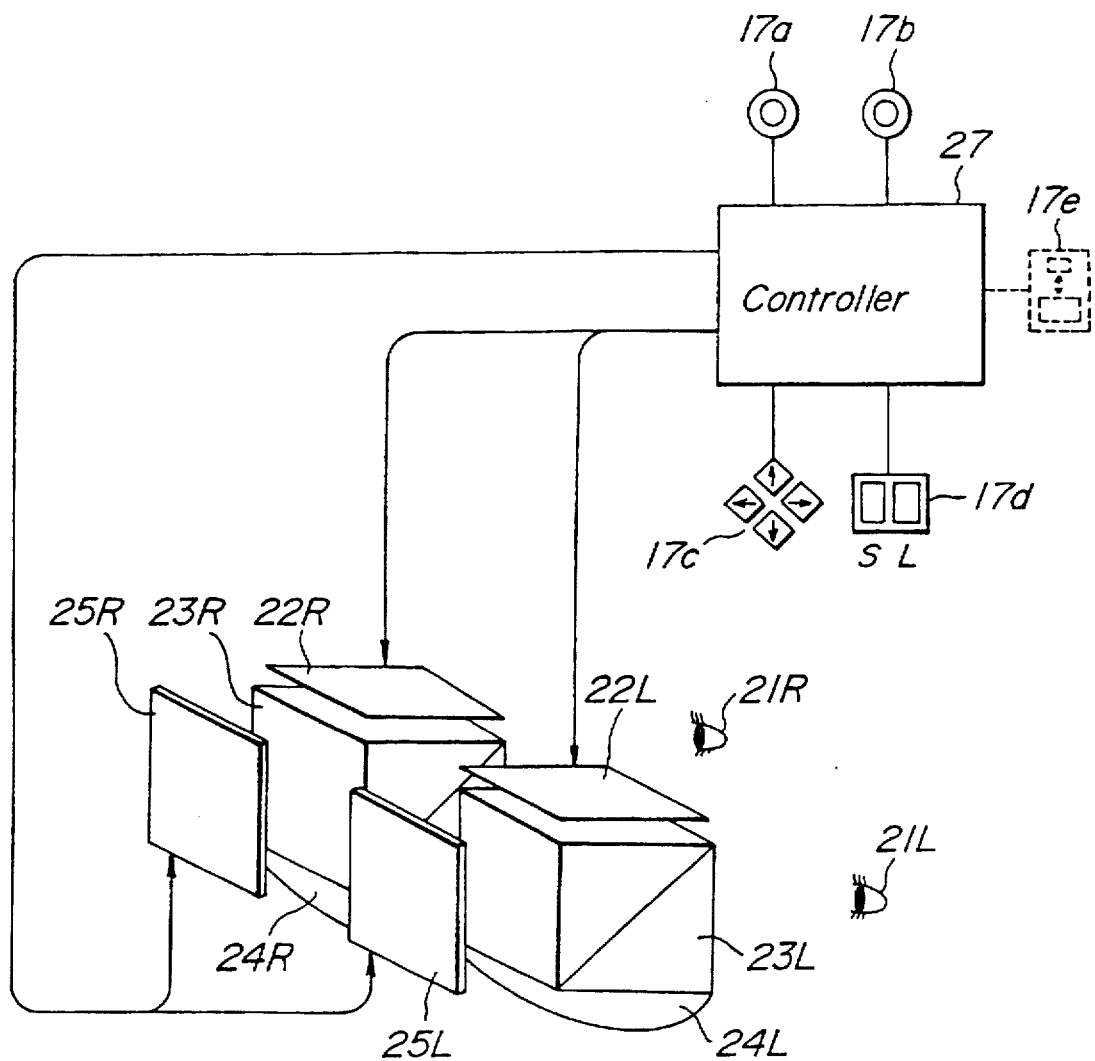
FIG._2

FIG_3
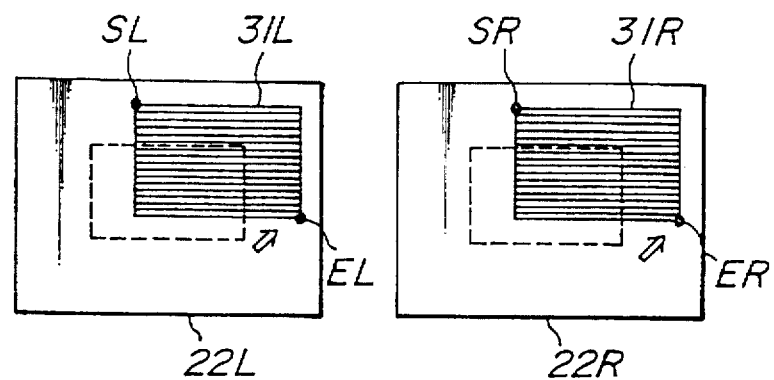
FIG_4
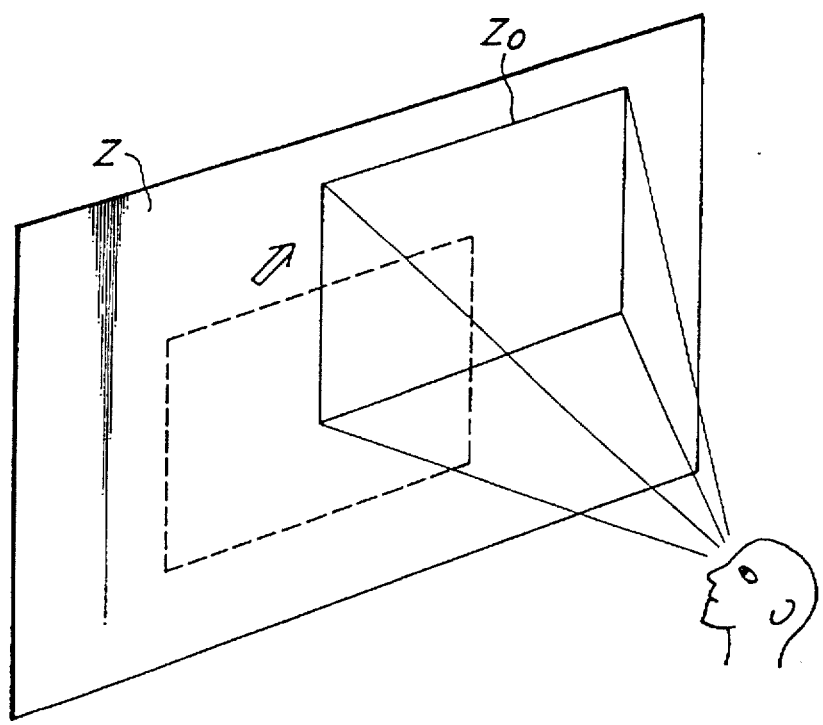

FIG_7
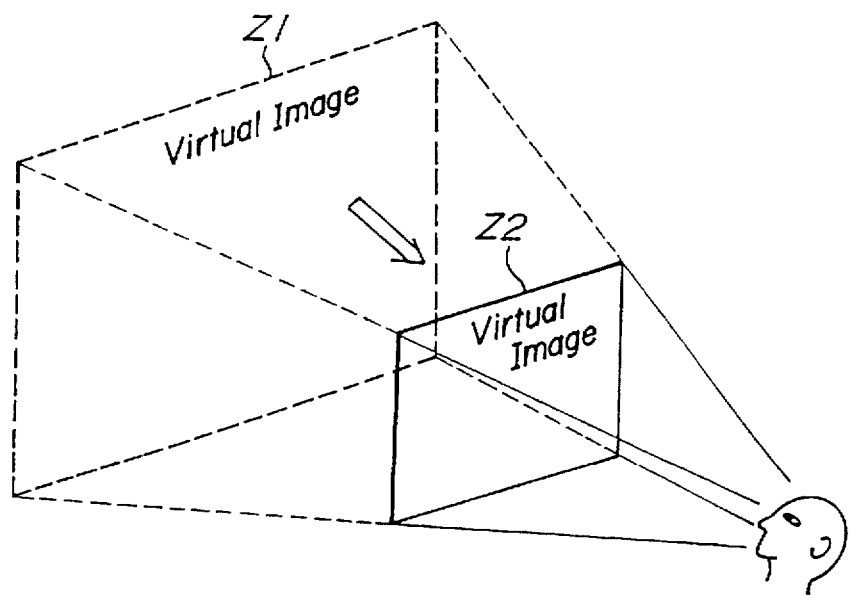
FIG_8A    FIG_8B
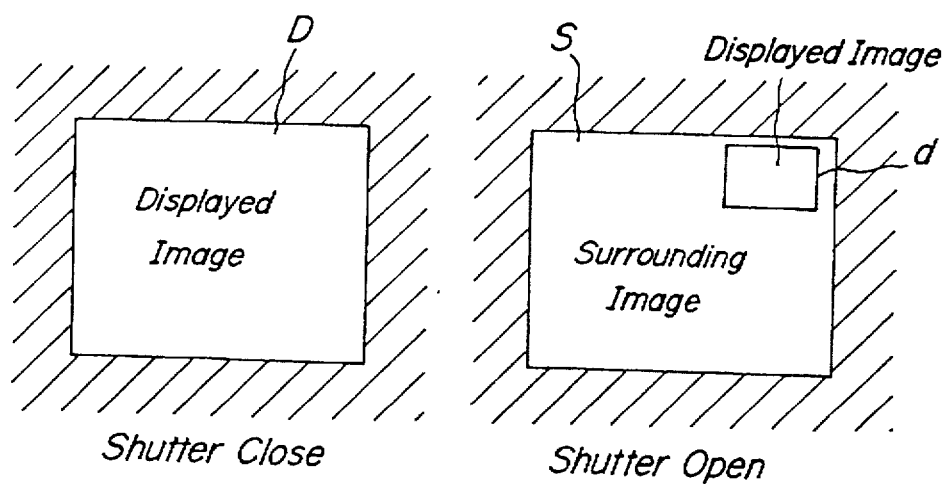
Shutter Close    Shutter Open

FIG_9
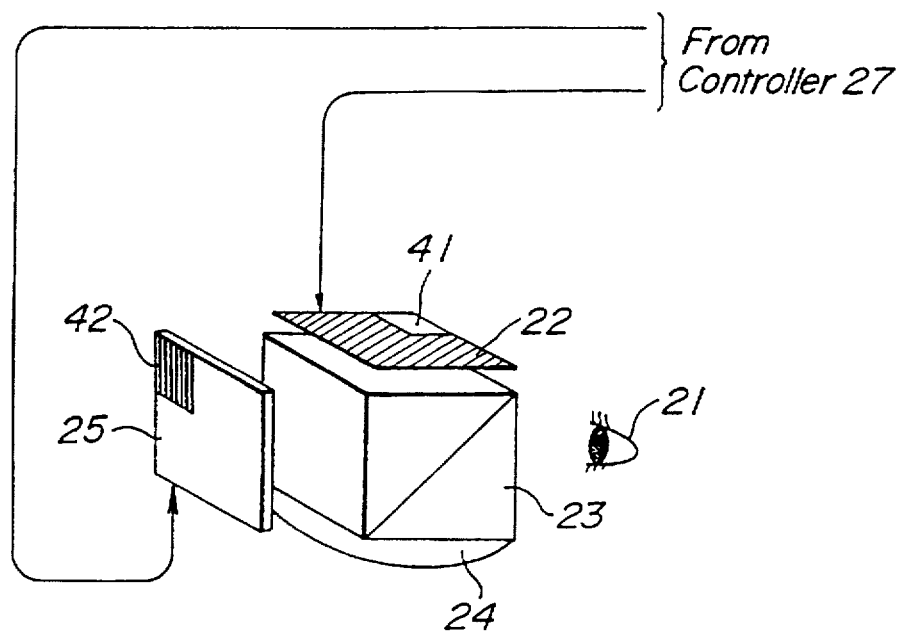

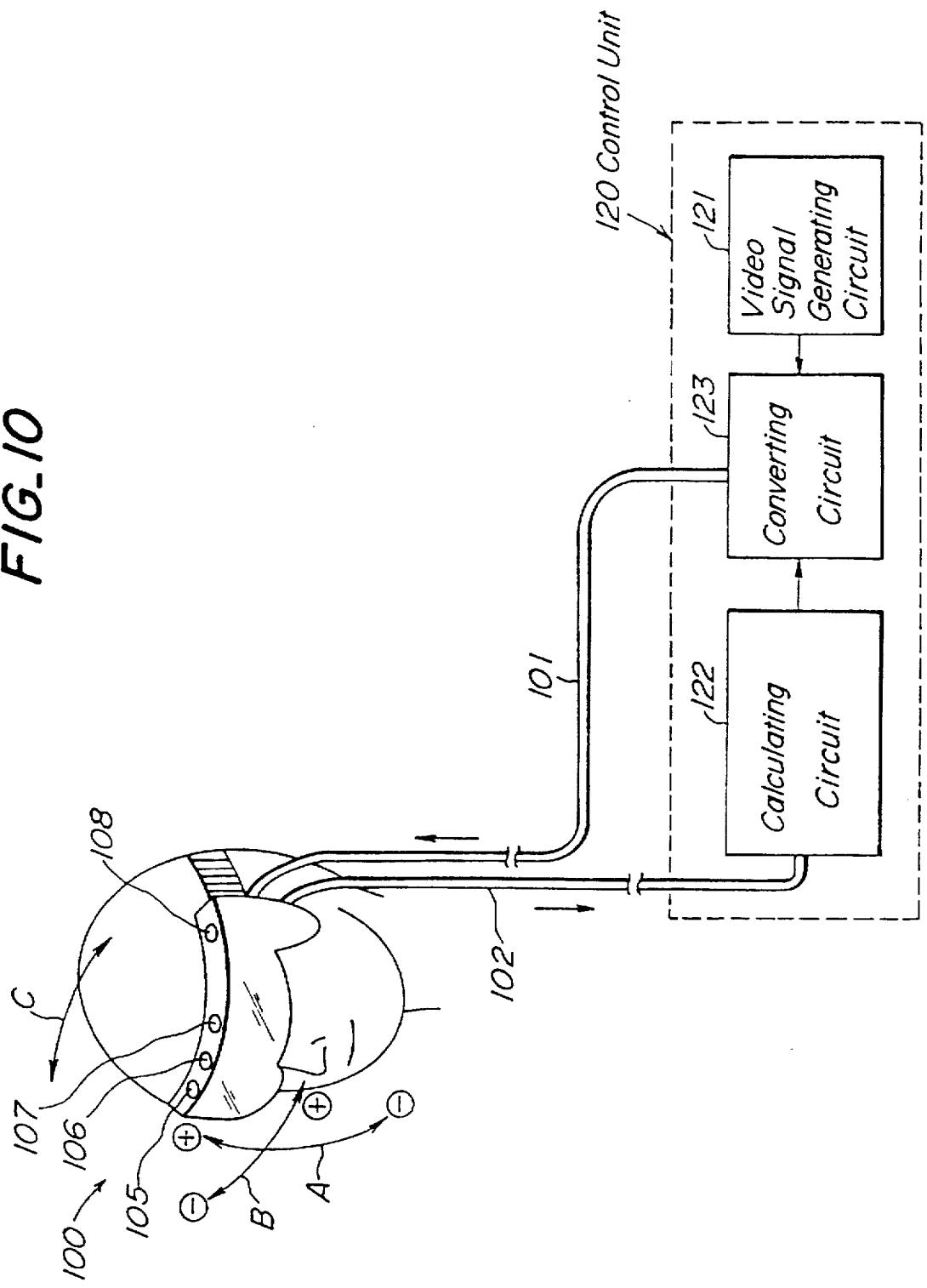

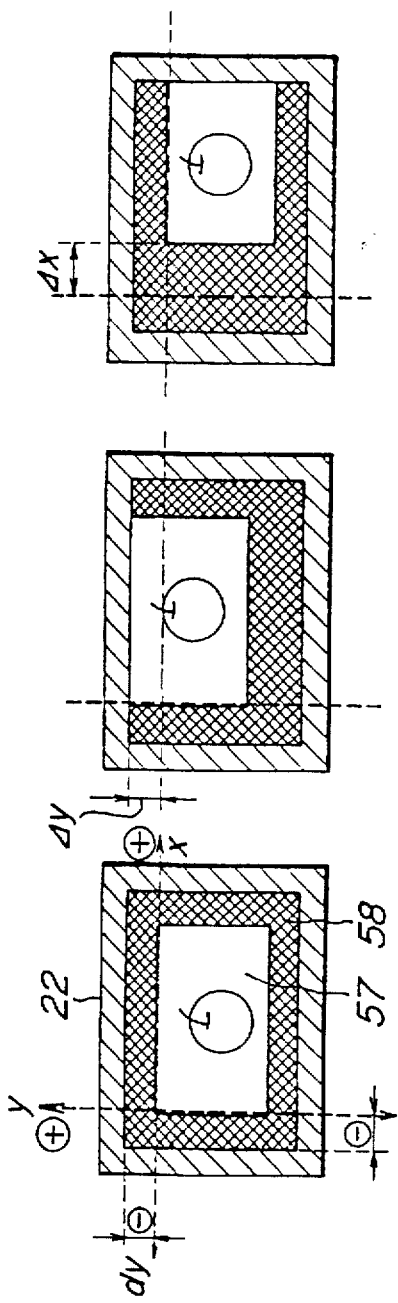
FIG_11A  FIG_11B  FIG_11C  FIG_11D  FIG_11E

FIG_12
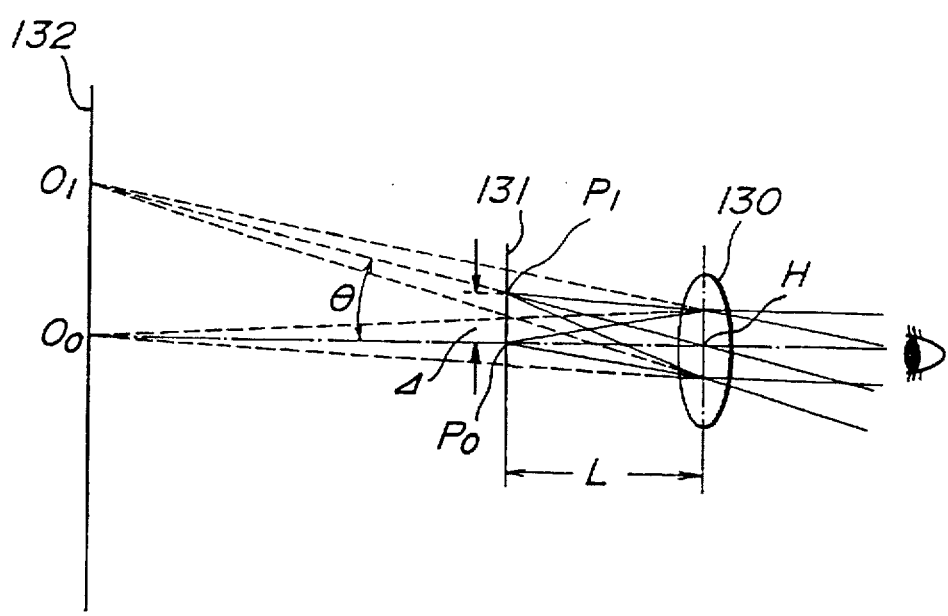

FIG_16A
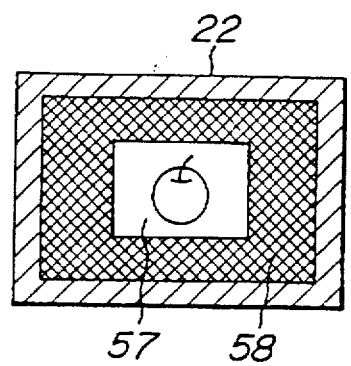
FIG_16B
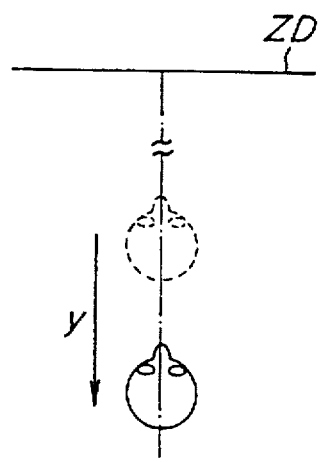

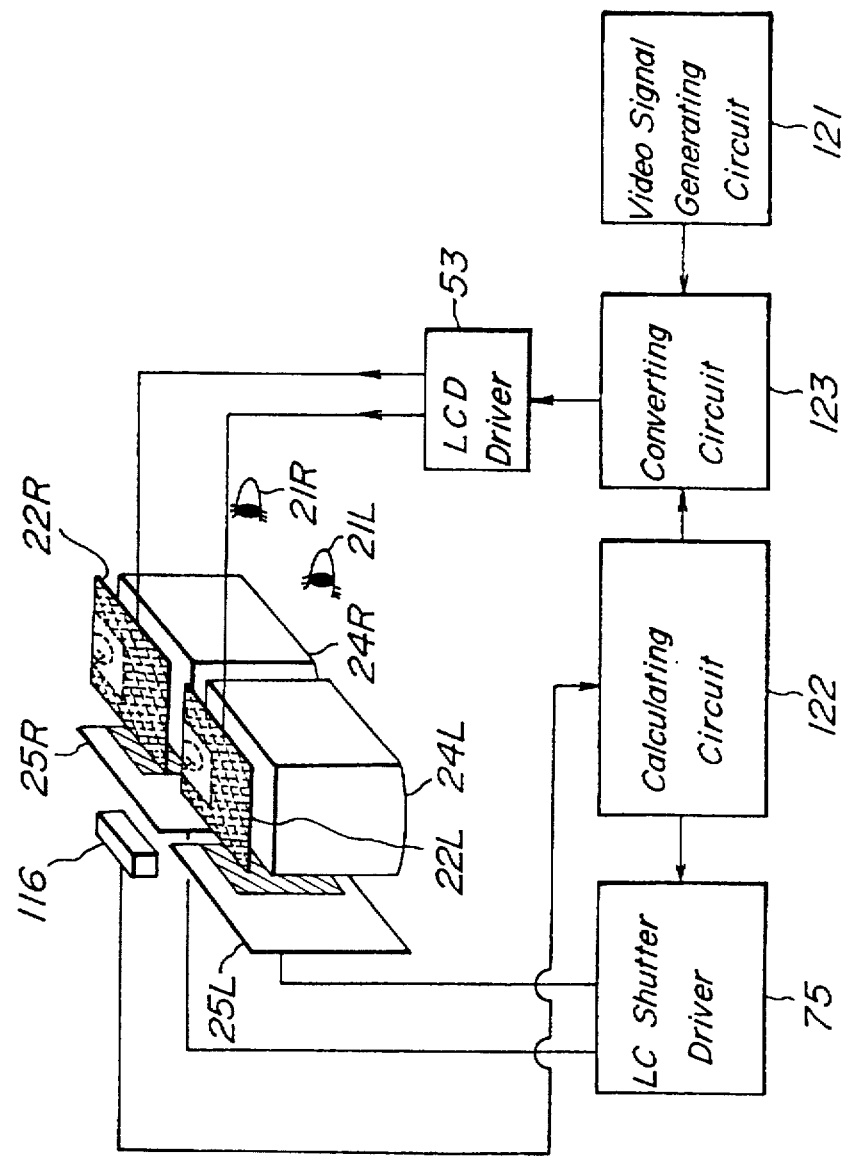

FIG_18
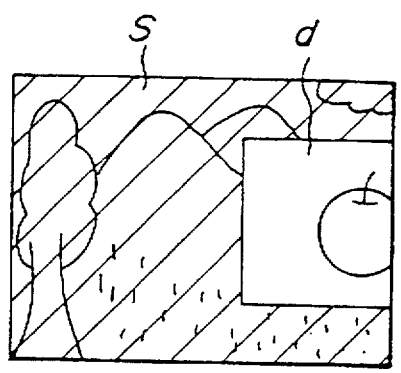
FIG_19
PRIOR ART
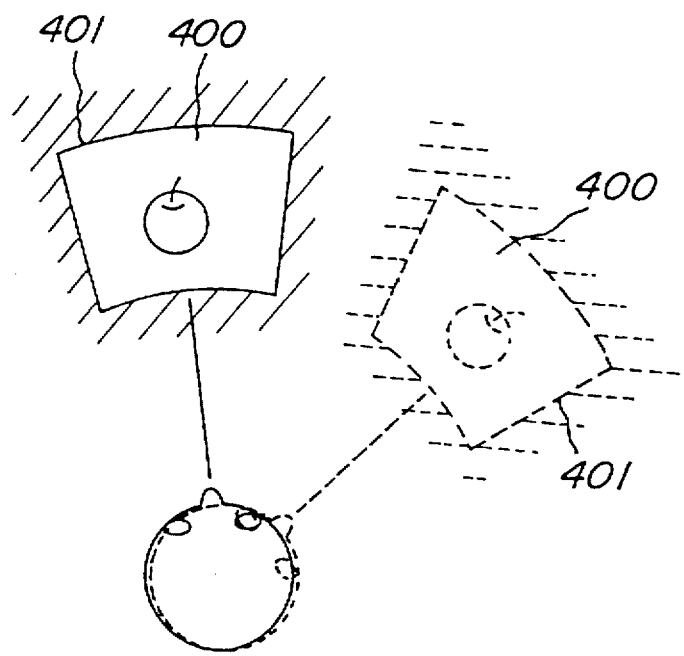

IMAGE DISPLAY APPARATUS OF HEAD MOUNTED TYPE

This is a continuation of application Ser. No. 08/242,605 filed May 13, 1994 now U.S. Pat. No. 5,579,026.

BACKGROUND OF THE INVENTION

1. Field of the Invention

The present invention relates to an image display apparatus of head mounted type comprising an image displaying means for displaying first and second images to be observed by right and left eyes of a user wearing the image display apparatus and an optical system for forming first and second virtual images of said first and second images displayed on said image displaying means such that said virtual images can be seen by the user.

2. Description of the Preferred Embodiments

In Japanese Patent Application Laid-open Publications Kokai Hei Nos. 3-188777, 4-26289 and 4-168489, there are disclosed image display apparatuses in the form of goggles or spectacles, in which first and second images displayed on first and second liquid crystal display panels, respectively are projected into right and left eyes of a user by means of an optical system.

Such an apparatus is inherently of a personal use type, and only the user who wears the apparatus can see a virtual image of a relatively large size. Further, the display apparatus can give an impression of a so-called virtual reality, and the user feels that he or she is actually in a virtual space formed by the displayed virtual image. Moreover, a three dimensional image can be easily realized.

The known head mounted type image display apparatus disclosed in the above publication 4-26289 has a function of viewing surroundings even while wearing the apparatus.

In the known image display apparatus of the kind mentioned above, a position of the virtual image in the space as well as a size of the virtual image are fixed. If the position and size of the virtual image could be changed by the user at will, the image display apparatus would have a new function and an enhanced variety. It might be considered that the position and size of the virtual image could be changed by moving the liquid crystal display panel or mirror or lens. However, this might result in the apparatus being large in size, complicated in construction and expensive in cost, because it would be necessary to provide driving mechanisms and spaces for the movement of these parts.

Further, in the known image display apparatuses, not only position and size of the image, but also posture and shape of the image are not changed. Therefore, when the user moves with respect to the virtual image plane or the head of the user is moved or rotated, the virtual image 400 displayed in an image frame 401 is also moved as illustrated in FIG. 19. This might cause a strange or unnatural feeling and the user might be subjected to a bad feeling just like motion-sickness. Moreover, the frame 401 is fixedly determined by size and shape of the liquid crystal display panel and could not be changed.

In the known image display apparatus described in the above mentioned publication 4-168489, there is provided a detector for detecting a position of the apparatus put on the head of the user, and the displayed image is changed in accordance with a detected position. Therefore, a quasi-stereoscopic image can be seen, so that the above mentioned problems could be solved to a limited extent. In order to improve the natural feeling of the three-dimensional display, the frame 401 should not be seen by the user. Therefore, it is necessary to use the optical system having an angle of view larger than 120°. This results in another problem that the apparatus is liable to be large.

It might be considered that the liquid crystal display panel or optical system could be moved mechanically. However, as explained above, this solution would causes other problems wherein the apparatus becomes large in size, complicated in construction and expensive in cost.

SUMMARY OF THE INVENTION

The present invention has for its object to provide a novel and useful image display apparatus of head mounted type, in which at least one of position, posture, size and shape of the virtual image formed by the optical system can be changed without moving the image display means and optical system.

It is another object of the invention to provide an image display apparatus of head mounted type, in which the image is displayed on a part of the display panel and position, posture, size and shape of the displayed image can be changed on the display panel, in a purely electronic manner.

It is still another object of the invention to provide an image display apparatus of head mounted type, in which position, posture, size and shape of the displayed image can be changed in such a manner that the natural feeling can be attained.

According to the invention, an image display apparatus of head mounted display type comprises:

- an image displaying means including first and second image display screens on which first and second images to be observed by right and left eyes, respectively of a user wearing the image display apparatus are displayed;
- an optical system for forming virtual images of said first and second images displayed by said image displaying means such that said virtual images can be seen by the user; and
- a control means for controlling electronically at least one of position, posture, size and shape of the first and second images displayed on the first and second image display screens, respectively.

In the image display apparatus according to the invention, when the position and size of the image displayed on the display screen are changed or adjusted in an electronic manner, the position and size of the virtual image in the space and the size of the virtual image can be changed without moving mechanically or physically the display panel and/or optical system. Therefore, it is not necessary to provide any special space and mechanism for moving the display panel and/or optical system, and thus the image display apparatus can be small in size, simple in construction and cheap in cost.

Further, in a preferable embodiment of the image display apparatus according to the invention, position, posture, size and shape of the displayed image are changed in accordance with the movement of a head and/or body of a user such that the virtual image plane is stationary even if the head and/or body is moved. Therefore, the user can see the virtual image naturally and any bad feeling like motion-sickness can be avoided effectively.

BRIEF DESCRIPTION OF THE DRAWINGS

FIG. 2 is a schematic view showing the construction of main unit and controller of the first embodiment of FIG. 1;

FIG. 3 is a schematic view showing the movement of the real images;

FIG. 4 is a perspective view representing the movement of the virtual image;

FIG. 7 is a schematic view showing the movement of the virtual image;

FIGS. 8A and 8B are schematic view depicting the function of the liquid crystal shutter in a third embodiment of the image display apparatus according to the invention;

FIG. 9 is a perspective view showing a modification of the third embodiment of the image display apparatus according to the invention;

FIG. 10 is a schematic view representing a fourth embodiment of the image display apparatus according to the invention;

FIGS. 11A to 11E are schematic views illustrating the movement of the real image in the fourth embodiment;

FIG. 12 is a schematic view for explaining the principle of making the virtual image stationary;

FIGS. 16A and 16B are schematic views explaining the change in size of the display image;

FIG. 17 is a schematic view depicting a sixth embodiment of the image display apparatus of head mounted type according to the invention;

FIG. 18 is a schematic view of the image seen by the user; and

FIG. 19 is a schematic view showing the operation of the known image display apparatus of head mounted type.

DESCRIPTION OF THE PREFERRED EMBODIMENTS

Figure 1:
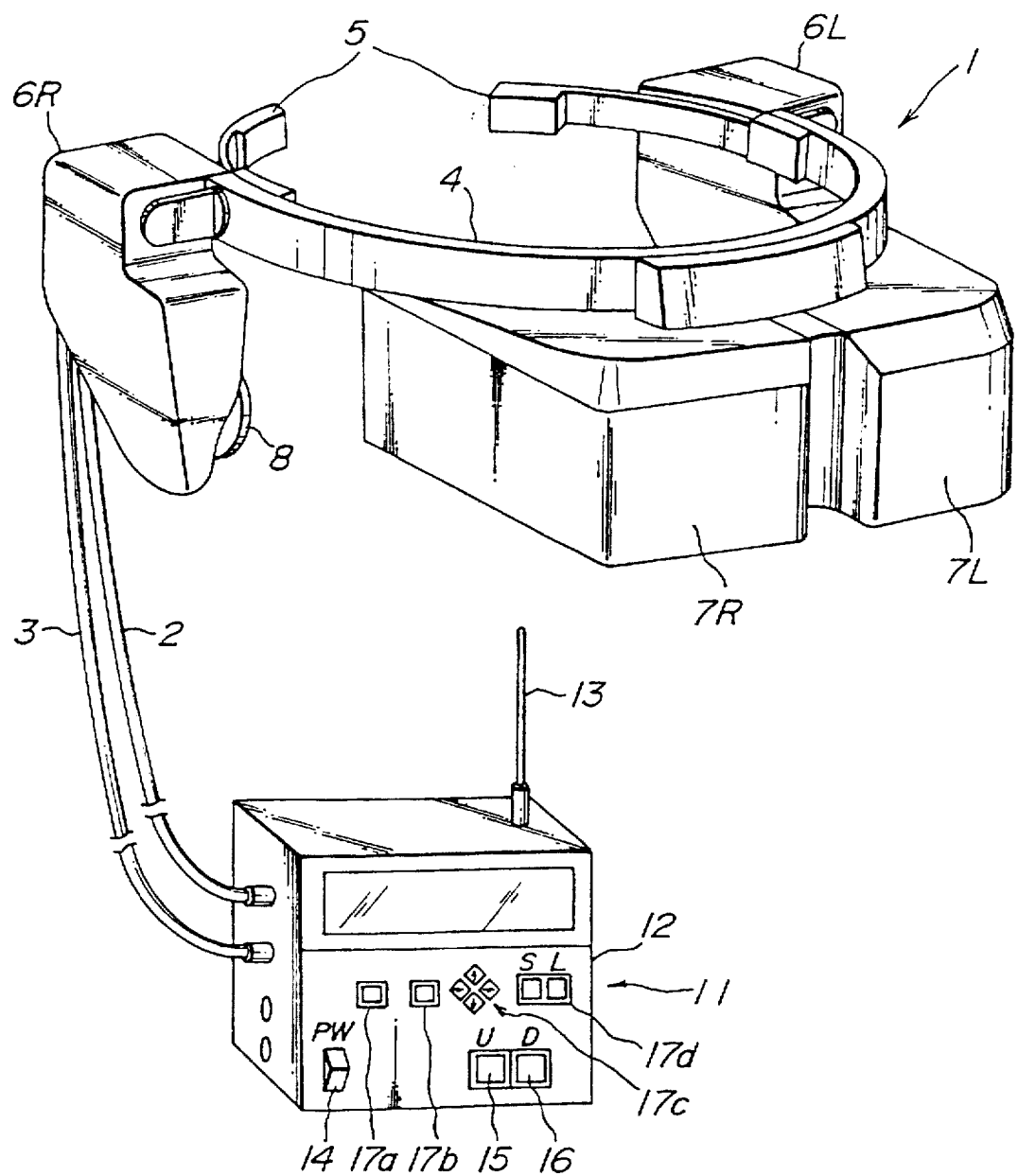
FIG. 1 is a perspective view illustrating a first embodiment of the image display apparatus of head mounted type according to the invention.

FIG. 1 is a perspective view showing a whole construction of a first embodiment of the image display apparatus according to the invention. In the present embodiment, the image display apparatus comprises main unit 1 and control unit 11 connected to the main unit 1 by means of video-audio signal cable 2 and control cable 3. The main unit 1 is constructed in the form of goggles, so the present apparatus may be called a face mounted type display. The main unit 1 comprises main frame 4, head clamping arms 5, earphone units 6L and 6R for left and right ears of a user and image display units 7L and 7R for left and right eyes of the user. The control unit 11 includes main body 12 of portable type, rod antenna 13 of telescopic type, power switch 14, TV channel up-down switches 15, 16, and four control buttons 17a, 17b, 17c and 17e.

FIG. 2 is a schematic view showing the detailed construction of the main unit 1. In FIG. 2, a controller provided in the control unit 11 is also shown. The main unit 1 of the image display apparatus comprises first liquid crystal display panel 22L for displaying a first image to be observed by a left eye 21L of the user who wears the image display apparatus, first beam splitter 23L for receiving a light flux emanating from the first liquid crystal display panel 22L and first concave mirror 24L for reflecting a light flux transmitted through the first beam splitter 23L, said light flux reflected by the first concave mirror being reflected by the first beam splitter 23L toward the left eye 21L. The image display apparatus further comprises a second liquid crystal display panel 22R for displaying a second image to be observed by a right eye 21R of the user, second beam splitter 23R for receiving a light flux emanating from the second liquid crystal display panel 22R and second concave mirror 24R for reflecting a light flux transmitted through the second beam splitter 23R, said light flux reflected by the second concave mirror being reflected by the second beam splitter 23R toward the right eye 21R.

The first and second liquid crystal panels 22L and 22R are arranged at focal points of the first and second concave mirrors 24L and 24R, respectively. In the present embodiment, the image display apparatus has a see-through function, so that the user can see his or her normal surroundings without taking off the main unit 1 of the image display apparatus. To this end, there are arranged first and second liquid crystal shutters 25L and 25R in front of the first and second beam splitters 23L and 23R, respectively. The first and second liquid crystal panels 22L, 22R, first and second liquid crystal shutters 25L and 25R are all connected to a controller 27. All the above mentioned components are mounted on a main body. In the present embodiment, the main body is constructed in the form of the goggles or spectacles as illustrated in FIG. 1, so that when the user puts on the apparatus, the user's left and right eyes are faced to the first and second beam splitters 23L and 23R, respectively.

The first liquid crystal display panel 22L, beam splitter 23L, concave mirror 24L and liquid crystal shutter 25L are arranged within the image display unit 7L and the second liquid crystal display panel 22R, beam splitter 23R, concave mirror 24R and liquid crystal shutter 25R are arranged within the image display unit 7R.

The controller 27 supplies first and second image signals to the first and second liquid crystal panels 22L and 22R, respectively to display first and second images on the first and second liquid crystal panels respectively. It should be noted that the first and second image signals may be identical with each other, and then a normal two-dimensional image can be observed by the user. When the first and second image signals are not identical with each other and include a parallax, that is to say, the first image signal represents an image of an object viewed by a left eye and the second image signal denotes an image of the same object viewed by the right eye, the user can see a three-dimensional image. According to the invention, both the two-dimensional image and three-dimensional image can be displayed.

The first and second liquid crystal shutters 25L and 25R are controlled by the controller 27 such that when a see-through button 17a provided on the control unit 11 as shown in FIG. 1 is pressed by the user, the controller functions to stop the supply of the first and second image signals to the first and second liquid crystal panels 22L and 22R and at the same time the liquid crystal shutters are opened. That is to say, the liquid crystal shutters 25L and 25R are changed from an opaque condition into a transparent condition, and thus the user can see the surroundings through the shutters 25L, 25R and beam splitters 23L, 23R without being obstructed by the images. In this manner, in the present embodiment, the user can see the surroundings without taking off the main unit 1 of the image display apparatus. Further, when the user presses a superimpose button 17b, the first and second shutters 25L and 25R are opened while the supply of the first and second image signals to the first and second liquid crystal panels 22L and 22R is not stopped. Then, the user can see the surroundings and images displayed on the liquid crystal image display panels 22L and 22R in the superimposed manner. The audio signal is supplied from the control unit 11 to the main unit 1 via the audio-video signal cable 2 and sounds are reproduced by earphones 8 provided in the main unit 1. When one of the see-through button 17a and superimpose button 17b is actuated, the supply of the audio signal is stopped. It should be noted that according to the invention, the supply of the audio signal to the main unit 1 may be continued even when the buttons 17a, 17b are actuated.

According to the invention, position and size of the first and second images displayed on the first and second liquid crystal display panels 22L and 22R can be changed by adjusting position switch 17c and size switch 17d provided on the control unit 11. In order to change the position of the displayed images, the displayed image should be smaller than a size of the liquid crystal display panels 22L, 22R as illustrated in FIG. 3. The position switch 17c includes four switching elements and the size switch 17d comprises two switching elements. By adjusting the position switch 17c, addresses of scan start pixels of the first and second images 31L and 31R displayed on the liquid crystal display panels 22L and 22R respectively, usually upper left pixels SL and SR shown in FIG. 3 can be changed, and by adjusting the size switch 17d, it is possible to change addresses of scan end pixels, usually lower right pixels EL and ER. In this manner, the position and size of the images 31L and 31R displayed on the first and second liquid crystal panels 22L and 22R can be adjusted. In the present embodiment, the scan start and end addresses SL and EL of the first image 31L and the scan start and end addresses SR and ER of the second image 31R are changed correspondingly to each other. That is to say, the positions and sizes of the first and second images 31L and 31R are changed in a mutually corresponding manner. For instance, when the first image on the first liquid display panel 22L is moved toward the right upper corner, the second image of the second liquid crystal display panel 22R is also moved toward the right upper corner, and the sizes of the first and second images are changed at the same ratio. As illustrated in FIG. 3, the first and second images 31L and 31R are moved in the same direction by the same distance from the standard positions illustrated by broken lines, and the sizes of the first and second images are always equal to each other. Therefore, when the first and second images 31L and 31R are moved as shown in FIG. 3, a virtual image $Z_0$ observed by the user is shifted on the virtual image plane Z as illustrated in FIG. 4.

In the present embodiment, the position and size of the virtual image $Z_0$ seen by the user can be changed by operating the position switch 17c and size switch 17d provided on the control unit 11 and connected to the controller 27, and therefore the versatility of the image display apparatus is improved. According to the invention, the above mentioned change in the position and size of the displayed images can be performed in a purely electronic manner, and it is not necessary to provide a mechanism for mechanically moving the display panels and/or optical system. Therefore, the image display apparatus according to the invention can be made small in size, light in weight and less expensive in cost. This can mitigate physical stress applied upon the user who is wearing the apparatus.

Figure 5:
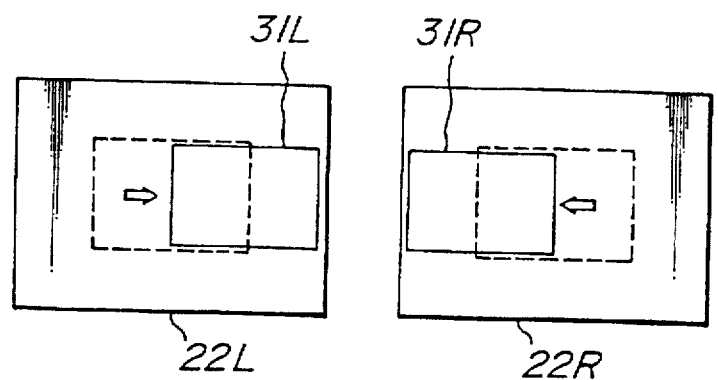
FIG. 5 is a schematic view representing the movement of the real images in a second embodiment of the image display apparatus according to the invention.
Figure 6:
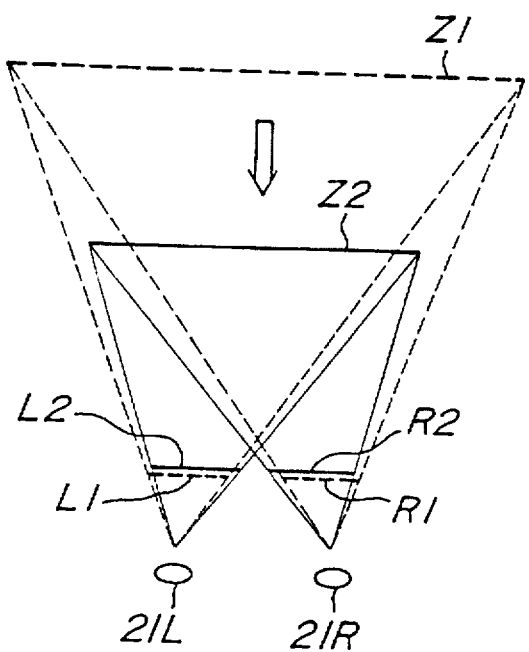
FIG. 6 is a schematic view illustrating the movement of the virtual image.

FIGS. 5, 6 and 7 are schematic views showing the operation of a second embodiment of the image display apparatus according to the invention. In the present embodiment, the controller 27 further comprises a depth switch 17e which is shown in FIG. 2 by a broken line. When this depth switch 17e is actuated by the user, the positions of the first and second images 31L and 31R are shifted in opposite horizontal directions as illustrated in FIG. 5. That is to say, when the first image displayed on the first liquid crystal display 22L is shifted in the right hand direction by a certain distance, the second image displayed on the second liquid crystal display 22R is shifted in the left hand direction by the same distance. FIG. 6 is a schematic view showing the movement of the virtual image in the depth direction. When first and second images L1 and R1 are displayed on the first and second liquid crystal display panels 22L and 22R at positions denoted by broken lines, the user can see a virtual image Z1 as shown in FIG. 6. When the first and second images L2 and R2 are shifted horizontally such that they come closer to each other, then the user can see a virtual image Z2 which is closer to the eyes 21L and 21R of the user. That is, by shifting horizontally the first and second images 31L and 31R in the opposite directions, the virtual image is shifted closer to or away from the user. In this manner, by operating the depth switch 17e, it is possible to change a depth of the virtual image observed by the user from Z1 to Z2 as depicted in FIG. 7. In this manner, the user can set the depth of the virtual image at will and thus the user can see the virtual image favorably.

FIGS. 8A and 8B are schematic views for explaining the operation of the third embodiment of the image display apparatus according to the invention. In the present embodiment, when the see-through mode is selected by actuating the see-through button 17a shown in FIGS. 1 and 2, the position and size of the first and second images displayed on the first and second liquid crystal display panels 22L and 22R are changed automatically such that a small virtual image d can be seen at a right upper corner in a field of view S as depicted in FIG. 8B. In the normal operation mode, the user can see a large virtual image D which extends over the whole field of view as illustrated in FIG. 8A. In the present embodiment, the controller 27 is constructed such that when the superimpose button 27b (see FIG. 1) is depressed by the user, the controller 27 supplies the signal to the liquid crystal shutters 25L and 25R and these shutters are opened. At the same time, the controller 27 converts the image signals supplied to the first and second liquid crystal display panels 22L and 22R such that small first and second images are displayed at right upper corners of the first and second liquid crystal display panels, respectively. In this manner, when the user operates the superimpose button 27b, the liquid crystal shutters 25L and 25R are opened and at the same time the images displayed on the liquid crystal display panels 22L and 22R are reduced and are moved into such positions that both the image of the surroundings S and the virtual image d can be seen with a small mutual interference.

FIG. 9 is a schematic view showing a modification of the third embodiment of the image display apparatus according to the invention shown in FIG. 8. In this modified embodiment, when the superimpose button 27b is pushed by the user, the liquid crystal shutter 25 is made partially transparent such that an area 42 is caused to remain opaque, said area 42 corresponding to an area in the field of view in which an image 41 displayed on a liquid crystal display panel 22 can be seen as a virtual image by an eye 21 of the user through the beam splitter 23 and concave mirror 24. Therefore, the virtual image is formed in the area in which the surroundings are not seen, so that the user can see the virtual image not being obstructed by the surroundings. In this modification, when the user operates the see-through button 17a, the whole area of the liquid crystal shutter 25 including the area 42 is made transparent and the supply of the image signal to the liquid crystal display panel 22 is stopped. Then, the user can see only the surroundings through the fully opened liquid crystal shutter 25 and beam splitter 23.

FIG. 10 is a schematic view showing the whole construction of the fourth embodiment of the image display apparatus according to the invention. The image display apparatus comprises a main unit 100 which is constructed in the form of goggles and a control unit 120. The main unit 100 and control unit 120 are connected to each other by means of audio-video signal cable 101 and control cable 102. The main unit 100 comprises first and second liquid image display panels for displaying first and second images, optical systems for light fluxes emanating from the first and second images into left and right eyes of a user, and first and second liquid crystal shutters. In the present embodiment, the main unit 100 further comprises detectors for detecting the motion of the head or body of the user. That is to say, there are provided a detector 105 for detecting a vertical rotation angle shown by a double headed arrow A, a detector 106 for detecting a horizontal rotation angle illustrated by a double headed arrow B and a detector 107 for detecting a swinging angle denoted by a double headed arrow C. Each of these detectors 105, 106 and 107 may be constructed by a gyroscope. The main body 100 further comprises a reset switch 108 for producing a reset signal. Detection signals and the reset signal are supplied to the control unit 120 via the control cable 102.

The control unit 120 comprises a video signal generating circuit 121 for generating original or standard video signals including first and second image signals for the left and right eyes of the user and first and second audio signals for left and right ears of the user. In a usual television signal, the first and second image signals are identical with each other. The control unit 120 further comprises a calculating circuit 122 for calculating amounts of shift and rotation angle of the first and second images to be displayed on the first and second liquid crystal display panels in accordance with the detection signals from the detectors 105, 106 and 107 for detecting the motion of the head of the user. That is to say, the calculating circuit 122 calculates amounts of shift of the images in mutually orthogonal directions x and y and a rotation angle in accordance with the vertical rotation angle, horizontal rotation angle and swinging angle detected by the detectors 105, 106 and 107, respectively. The control unit 120 further comprises an image converting circuit 123 for converting the original image signals into converted image signals in accordance with the calculated data representing the shift amounts and rotation angles supplied from the calculating circuit 122. The thus converted first and second image signals are supplied via the audio-video signal cable 101 to the main unit 100 and are supplied to the first and second liquid crystal display panels. Then, the converted first and second images are displayed on the first and second liquid crystal display panels such that positions and postures of the displayed first and second images are adjusted and the virtual image is always formed at a fixed position in the space even if the user moves his or her head. In the present embodiment, the audio signals are not changed in accordance with the movement of the head and/or body of the user, and the first and second audio signals are supplied to earphones provided in the main unit 100. However, according to the invention, the intensities of the right and left audio signals may be changed in accordance with the shift of the displayed image.

Next the operation of the detectors 105, 106 and 107, a manner of calculating the conversion amounts in the calculating circuit 122 and the converting operation in the image converting circuit 123 will be explained.

At first, a principle for forming the virtual image which is fixed in the field of view even if the user moves his or her head and/or body will be explained. FIG. 12 shows a relationship of an optical system, a real image plane on which the real image is displayed and a virtual image plane on which the virtual image is formed. A reference numeral 130 denotes the optical system such as the concave mirror and the real image plane 131 represents the screen of the liquid crystal display panel in the previous embodiments. In the previous embodiments, when the head of the user is rotated by an angle θ, the virtual image formed on the virtual image plane 132 is also moved by the same angle θ. Therefore, when it is required to make the virtual image stationary on the virtual image plane 132 although the head or body is moved, it is necessary to move the virtual image by the same angle θ in opposite direction. Then, it can be calculated by what angle the image displayed on the real image plane 131, i.e. on the liquid crystal display panel, should be moved.

For instance, in FIG. 12, it is assumed that the head of the user is rotated such that a point $O_0$ is shifted into a point $O_1$ on the virtual image plane 132. Then, an angle formed by points $P_0$, principal point H and point $P_1$ is equal to θ. Therefore, a distance Δ between the points $P_0$ and $P_1$ on the real image plane 131 is given by an equation of Δ=L·tan θ, wherein L is a distance between the real image plane 131 and the principal point H of the optical system 130. For example, when L=24 mm and θ=20°, the distance Δ becomes 8.7 mm.

When the head of the user is rotated in a direction by an angle θ, the image is stationary on the virtual image plane 132 by moving the point $P_1$ on the real image plane 131 in a direction opposite to said direction by a distance Δ.

Now the movement and rotation of the real image formed on the liquid crystal display panel for attaining the stationary virtual image on the virtual image plane will be explained.

FIG. 11A shows the standard image which is displayed on the liquid crystal display panel 22 when the original image signal is neither shifted nor rotated. It should be noted that the whole area of a display screen is larger than an area of the displayed image so that the standard image can be shifted and/or rotated within the frame of the display screen. That is, the image 57 is not displayed over the whole area of the liquid crystal display panel 22, but there is formed a non-display area 58. FIG. 11B illustrates a condition in which the image is shifted upward by a distance Δy when the head of the user is rotated downwardly. FIG. 11C depicts a condition in which the standard image is shifted in the right hand direction by a shift amount Δx when the head of the user is rotated in the left hand direction, and FIG. 11D represents a case in which the standard image is rotated in the anticlockwise direction by an angle Δø when the head is rotated in the clockwise direction by the same angle. It should be noted that according to the invention, the standard image can be moved in a combination of these up-down movement, right-left movement and rotational movement. For instance, in a condition illustrated in FIG. 11E, the standard image is shifted in the upward direction by Δy as well as in the right-hand direction by Δx, and is rotated in the clockwise direction by Δø when the head of the user is rotated in the downward direction as well as in the anti-clockwise direction.

Now it is assumed that the vertical rotation angle is denoted by α and the horizontal rotation angle is represented by β. The upward rotation and right hand rotation are denoted by + sign and downward rotation and left hand rotation are shown by − sign. Therefore, when the head of the user is rotated downward, the image displayed on the liquid crystal display panel 22 is moved along the y axis in the direction of positive sign as illustrated in FIG. 11B. When the user rotates the head in the right hand direction, the image is shifted along the x axis in the direction of positive sign as shown in FIG. 11C.

The amount by which the image 57 is shifted on the liquid crystal display panel 22 can be derived from the above equation in the following manner.

When the head is rotated downward by an angle α, the image is shifted in the y axis by an shift amount Δy:

$$\Delta y = L \cdot \tan \alpha. \quad (1)$$

When the head is rotated in the right hand direction by an angle β, the image is shifted in the x axis by an amount Δx:

$$\Delta x = L \cdot \tan \beta \quad (2)$$

By moving the real image displayed on the liquid crystal display panel 22 in the manner explained above, the virtual image seen by the user is stationary in the space even if the head of the user is moved.

According to the invention, the following control may be carried out, if any. As shown in FIG. 11A, widths of the non-display area 58 in the x and y axes are denoted by dx and dy, respectively.

When $dy \leq L \cdot \tan \alpha$,
then a shift amount Δy is set to dy (Δy=dy). (3)

When $dx \leq L \cdot \tan \beta$,
then a shift amount Δx is limited to dx (Δx=dx). (4)

This means that the shift amounts in the x and y axes are limited to the widths dx and dy of the non-display area 58. Therefore, even when the user rotates the head over a large angle, the image is not cut at all.

It should be noted that the widths dx and dy of the non-display area 58 may be set to desired values. For instance, data of the n on-display area 58 may be stored in ROM provided in the image converting circuit as will be explained later. When the widths dx and dy are set to be large, the display area 57 becomes smaller accordingly, and when the widths are set to be smaller, the display are a becomes larger.

When the head of the user is swung as denoted by the arrow C in FIG. 10, the image on the liquid crystal display panel 22 is rotated as illustrated in FIG. 11D. In this case, a rotation angle Δø of the image is identical with the swinging angle of the head, but the rotating direction is opposite to the swinging motion of the head.

In the calculating circuit 122 shown in FIG. 10, the amounts of shifts Δx, Δy in the x and y axes and the rotation angle Δø are calculated in accordance with the vertical rotation angle α, horizontal rotation angle β, and swinging angle ø detected by the detectors 105, 106 and 107, respectively, while the shift amounts are limited by the widths dx and dy of the non-display area 58. Then, the thus calculated data of the shift amounts and rotation angle is supplied to the image converting circuit 123.

Figure 13:
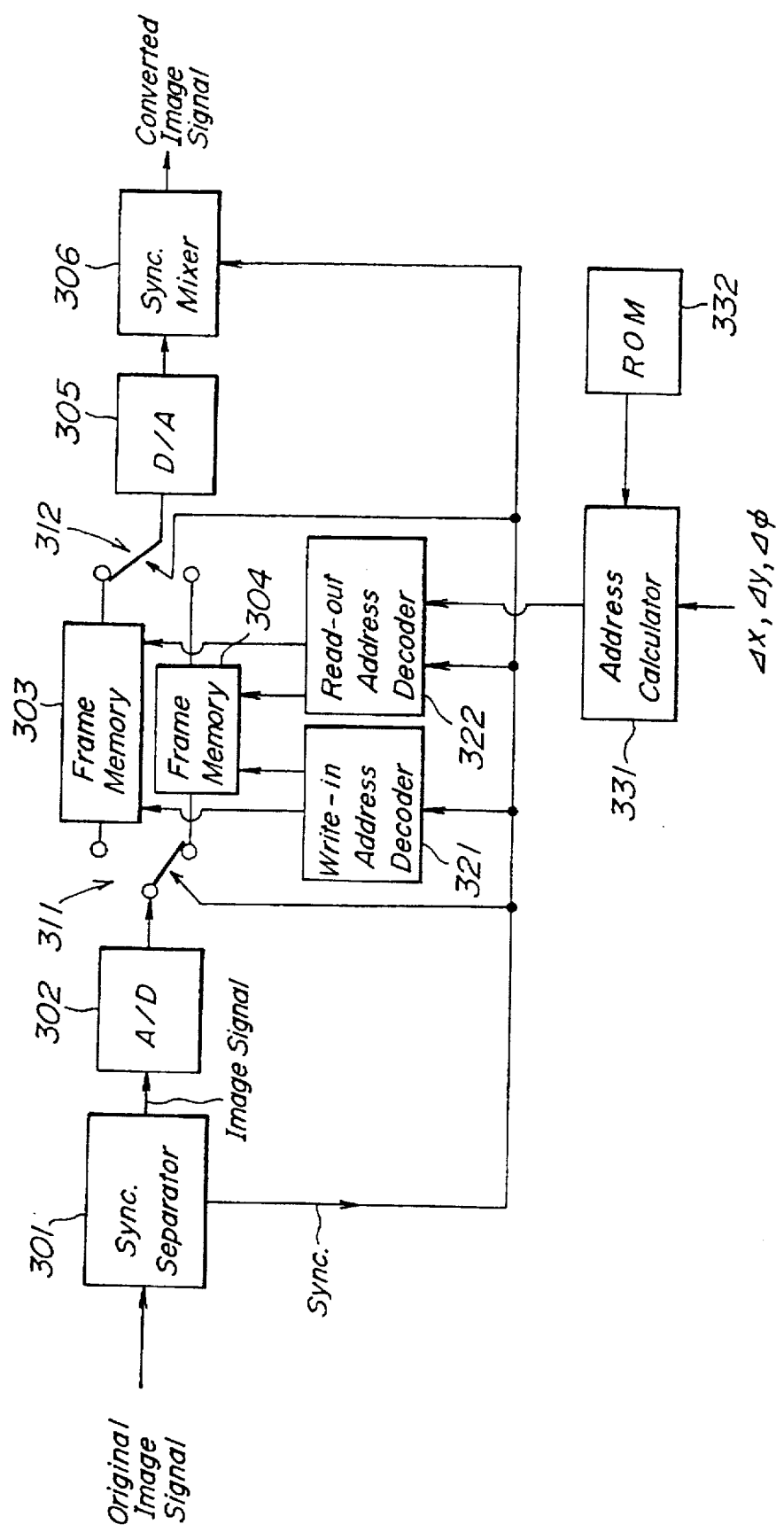
FIG. 13 is a block diagram depicting an embodiment of the image converting circuit.

FIG. 13 is a block diagram showing an embodiment of the image converting circuit 123. The image converting circuit 123 comprises an input unit having synchronizing signal separating circuit 301 and A/D converter 302 and an output unit including D/A converter 305 and synchronizing signal mixing circuit 306. The image converting circuit 123 further comprises switches 311 and 312, two frame memories 303, 304 for storing the image signal, write-in address decoder 321 for writing the image data into the frame memories, read-out address decoder 322 for reading the image data out of the frame memories, and address calculating unit 331 for calculating read-out addresses for the read-out address decoder. The above mentioned data representing the shift amounts Δx, Δy and rotation angle Δø is supplied to the address calculating unit 331 together with the data dx and dy of the widths of the non-display area 58 stored in a ROM 332.

Now the operation of the image display apparatus of the present embodiment will be explained.

After putting on the main unit 100 of the image display apparatus, the reset switch 108 is once pushed, while the user's face is directed straight forward. Then, the reset signal is supplied to the calculating circuit 122 via the control cable 102. In the calculating circuit 122, shift amounts Δx and Δy and rotation angle Δø are set to zero. Then, the data to the image converting circuit 123, i.e. the input data Δx, Δy and Δø are also zero, so that the calculation of address in the address calculating unit 331 is performed by using the data dx and dy of the non-display area 58 supplied from the ROM 332.

Therefore, the image converting circuit 123 processes the original image signal supplied from the video signal generating circuit 121 such that the standard image is displayed on the liquid crystal display panel 22 as shown in FIG. 11A. That is to say, there are upper and lower margins dy and right and left hand margins dx. In this manner, the image 57 is displayed at the center of the liquid crystal display panel 22.

When the head of the user is moved, the vertical rotation angle α, horizontal rotation angle β and swinging angle ø are detected by the detectors 105, 106 and 107, respectively. These detected rotation angles and swinging angle are supplied to the calculating circuit 122 via the control cable 102. In the calculating circuit 122, the shift amounts Δx, Δy and rotation angle Δø are calculated in accordance with the vertical rotation angle α, horizontal rotation angle β and swinging angle ø in the manner explained before. Then, the thus calculated shift amounts Δx, Δy and rotation angle Δø are supplied to the image converting circuit 123. In the image converting circuit 123, the original image signal is processed in accordance with the shift amounts Δx, Δy and rotation angle Δø and the image displayed on the liquid crystal display panel 22 is shifted and/or rotated as illustrated in FIGS. 11B to 11E. The thus converted image signal is supplied to the main unit 100 via the audio-video signal cable 101 together with the sound signal. In the main unit 100, the converted image signal is supplied to the liquid crystal display panel 22L and 22R (see FIG. 2) and left and right hand images are displayed thereon at such position and posture that the virtual image is seen to be stationary in the virtual image plane.

In the image converting circuit 123 shown in FIG. 13, the image conversion is carried out in the following manner. The original image signal is first supplied to the synchronizing signal separating circuit 301 and a synchronizing signal is separated from a picture signal. The picture signal is converted by the A/D converter 302 into a digital picture signal. The synchronizing signal is supplied to the write-in address decoder 321, read-out address decoder 322 and synchronizing signal mixing circuit 306. The synchronizing signal is further utilized to actuate the switches 311 and 312 provided at input and output sides of the frame memories 303, 304, respectively. The digital picture signal from the A/D converter 302 is alternately supplied to the first and second frame memories 303 and 304 via the switch 311 and is stored therein. The picture signal is written in the frame memories 303 and 304 under the control of the write-in address supplied from the write-in address decoder 321. The picture signal is alternately read out of the first and second frame memories 303 and 304 via the switch 312. When the picture signal of a current frame is stored into the second frame memory 303, the picture signal of a preceding frame is read out of the first frame memory 304, while the switches 311 and 312 are set into the condition illustrated in FIG. 13. The order of reading out of the picture signal from the frame memories 303 and 304 is controlled by the read-out address supplied from the read-out address decoder 322 such that the image displayed on the liquid crystal display panel 22 is shifted and/or rotated in such a position and/or posture that the virtual image is seen to be stationary in the virtual image plane. To this end, the order of reading-out is determined by the address calculating circuit 331 in accordance with the shift data $\Delta x$, $\Delta y$ and rotation data $\Delta\phi$. That is to say, the shift data and rotation data $\Delta x$, $\Delta y$ and $\Delta\phi$ are supplied to the address calculating circuit 331 and the data dx and dy of the non-display area 58 is supplied from the ROM 332 to the address calculating circuit 331. The calculated result is supplied from the address calculating circuit 331 to the read-out address decoder 322, and the picture signal stored in the frame memories 303 and 304 is read out in the desired order. The thus read-out picture signal is converted into the analog picture signal by the D/A converter 305 and then the analog picture signal is added with the synchronizing signal in the synchronizing signal mixing circuit 306. In this manner, the converted image signal is supplied from the synchronizing signal mixing circuit 306.

In the present embodiment, the image signal is once stored in the frame memory and the read out order is controlled in accordance with the shift data $\Delta x$, $\Delta y$ and rotation data $\Delta\phi$ such that the position and/or posture of the image displayed on the liquid crystal display panel is changed in opposition to the actual movement of the head of the user, so that the user can see the stationary image even if the user moves the head and/or body. Therefore, the user can see the displayed image naturally, and thus the user scarcely has bad feeling like motion-sickness. Moreover, the stationary virtual image plane can be realized without using a special optical system having a large angle of view, and thus the main unit 100 can be small in size.

Now a fifth embodiment of the image display apparatus according to the invention will be explained with reference to FIGS. 14, 15A, 15B, 16A and 16B. In the present embodiment, not only the position and posture of the displayed image, but also the size and shape or configuration of the displayed image is changed by detecting the three-dimensional movement of the head.

Figure 14:
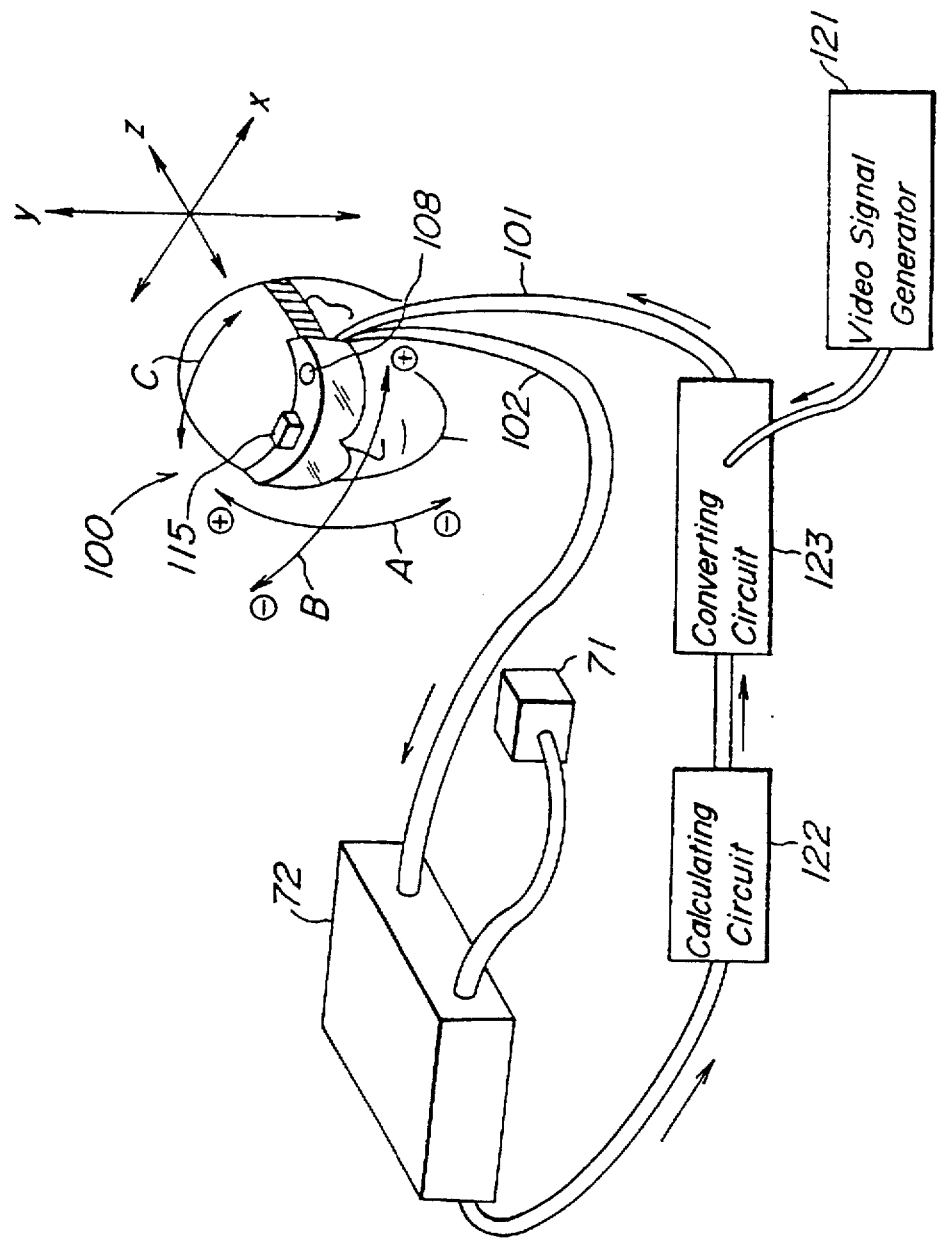
FIG. 14 is a schematic view showing a fifth embodiment of the image display apparatus of head mounted type according to the invention.

FIG. 14 is a schematic view showing the whole construction of the image display apparatus of the present embodiment. In the present embodiment, the movement of the head of the user is detected by means of a detecting means disclosed in Japanese Patent Application Laid-open Publication Kokai Sho 59-218539. For instance, "THREE DIMENSIONAL DIGITIZER" with electro-magnetic coupling manufactured by Polhemus Navigation Services, Inc. U. S. A. (see U.S. Pat. Nos. 3,983,474 and 4,017,858) may be utilized for this purpose. In this three dimensional digitizer, three coils are arranged mutually orthogonally and alternating currents are supplied to these coils to generate magnetic fields in a given space, and the user carries three detection coils also arranged mutually orthogonally. Currents induced within these detector coils are processed by a computer to detect data representing a position and posture of the detection coils within the space.

As shown in FIG. 14, the apparatus comprises a magnetic field generating circuit 71 for generating three magnetic fields directed to the mutually orthogonal directions (x, y and z axes) in the space and a magnetic field detecting unit 115 arranged on the main unit 100. As stated above, the magnetic field detecting unit 115 comprises three coils arranged mutually orthogonally. The currents induced within these coils are supplied to a circuit 72 for calculating amounts of movement and rotation angle of the head of the user in accordance with the currents detected by the magnetic field detecting unit 115. The thus calculated amounts of the movement and rotation angle are supplied to the calculating circuit 122 for calculating shift amounts $\Delta x$, $\Delta y$ and $\Delta\phi$. The thus calculated data $\Delta x$, $\Delta y$ and $\Delta\phi$ are supplied to the converting circuit 123 and the original image signal is converted in accordance with the data $\Delta x$, $\Delta y$ and $\Delta\phi$ in the manner explained above with reference to the previous embodiment.

Figure 15A:
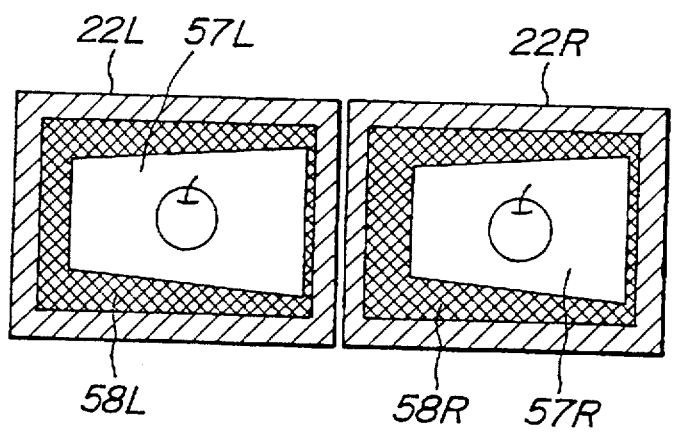
FIGS. 15A and 15B are schematic views illustrating the change in shape of the displayed image.
Figure 15B:
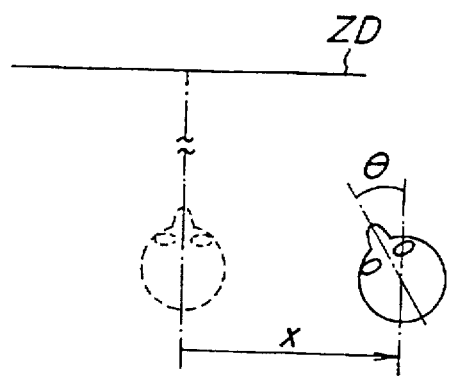

In the present embodiment, not only the position and posture of the displayed image, but also the shape of the displayed image are changed in accordance with the shift and rotation data. FIGS. 15A and 15B illustrate an example of such deformation of the displayed image. When the user is moved over a distance x from a reset position shown by a broken line to a position depicted by a solid line and the user rotates the head horizontally by an angle $\theta$ with respect to the virtual image plane ZD as shown in FIG. 15B, then the images 57L and 57R displayed on the liquid crystal display panels 22L and 22R, respectively are deformed as illustrated in FIG. 15A. That is, a height is gradually decreased from a right hand edge to a left hand edge.

When the user moves away from the virtual image plane ZD by a distance y as shown in FIG. 16B, the size of the displayed image 57 on the liquid crystal display panel 22 is decreased as depicted in FIG. 16A.

In the present embodiment, since the size and/or shape of the displayed image is controlled in addition to the position and/or posture of the displayed image in accordance with the movement and/or rotation of the head and/or body of the user, and therefore the feeling of reality that the virtual image plane is stationary can be improved.

In case of deforming the displayed images as shown in FIG. 15A, a degree of the deformation for the right hand image 57R is made different from that for the left hand image 57L, then there is produced a parallax and thus a quasi-stereoscopic image can be observed. Moreover, in case of the movement of the user in the z axis, the natural feeling may be improved by also changing an optical diopter.

FIGS. 17 and 18 show a sixth embodiment of the image display apparatus according to the invention. In the present embodiment, the liquid crystal shutters are controlled in accordance with the movement and/or rotation and change in size and/or shape of the displayed image, so that the user can see the surroundings most efficiently. In the present embodiment, portions similar to those of the previous embodiments are denoted by the same reference numerals used in the previous embodiments and they are not explained in detail. In the present embodiment, the controller comprises a liquid crystal shutter driver 75. The main unit comprises a position detector 116 for detecting a position and rotation of the head and/or body of the user. The converted image signal is supplied to the liquid crystal display panels 22R and 22L by means of a liquid crystal display driver 53 to display right and left images 57R and 57L. As explained above, these displayed images 57R and 57L assume only parts of the display panels 22R and 22L, so that there are non-display areas 58R and 58L. Then, in the superimposition mode, the liquid crystal shutters 25R and 25L are driven such that portions corresponding to the non-display areas 58R and 58L are selectively or locally made transparent. To this end, the data $\Delta x$, $\Delta y$ and $\Delta \phi$ calculated by the calculating circuit 122 is supplied to the liquid crystal display driver 75.

In the present embodiment, when the superimpose button is actuated, the user can see the virtual image d within the image of surroundings S as shown in FIG. 18. In this case, within the virtual image d the surrounding could not be seen, so that the user can see the virtual image without being affected by the surroundings. Also in the present embodiment, the displayed images 57R, 57L on the liquid crystal display panels 22R and 22L are shifted and/or rotated or the size and/or shape of these images are changed in accordance with the movement and rotation of the head and/or body of the user. Then, portions of the liquid crystal shutters 25R and 25L which are locally made transparent are changed accordingly, and thus the user can seen the virtual image always without being influenced by the surroundings.

The present invention is not limited to the embodiments explained above, but many modifications and alternations may be conceived by those skilled in the art within the scope of the invention. For instance, in the above embodiments, the shift amounts of the image in the x and y axes are limited to the widths dx and dy of the non-display area, but according to the invention, this limitation may be deleted. In this case, when the user rotates the head largely, the displayed image disappears gradually from the virtual image plane, so that the much more natural feeling can be attained.

What is claimed is:

1. An image display apparatus of head mounted display type, comprising:
   (a) an image display element displaying an image on an image display plane,
   (b) an optical system for introducing said image displayed on said image display plane of the image display element into an eye of a user,
   (c) a main body for being placed on a head of the user and supporting said image display element and said optical system, and
   (d) a control means for controlling said image display element to form an image display area and an image non-display area on the image display plane of said image display element, wherein said control means includes a detecting means for detecting a deviation of said main body from a standard position to derive a detection signal, a calculating means for calculating an amount of shift of the image displayed on the image display plane of the image display element, and an image converting means for converting an original image signal in accordance with said amount of shift, wherein said detecting means detects a horizontal rotation of at least one of the head of the user and the main body to produce a horizontal rotation signal, said calculating means calculates an amount of horizontal shift over which the image displayed on the image display plane of the image display element is horizontally shifted in a direction opposite to a direction of the detected horizontal rotation, and said image converting means converts the original image signal in accordance with said amount of horizontal shift such that although the main body is deviated from the standard position, a virtual image is observed by the user to be stationary on a virtual image plane.

2. An image display apparatus according to claim 1, wherein said detecting means detects, in addition to said horizontal rotation, a vertical rotation of at least one of the head of the user and the main body to derive a vertical rotation signal, said calculating means calculates, in addition to said amount of horizontal shift, an amount of vertical shift over which the image displayed on the image display plane of said image display element is vertically shifted in a direction opposite to a direction of said vertical rotation, and said converting means converts the original image signal in accordance with said amounts of horizontal shift and vertical shift.

3. An image display apparatus of head mounted display type, comprising:
   (a) an image display element displaying an image on an image display plane,
   (b) an optical system for introducing said image displayed on said image display plane of the image display element into an eye of a user,
   (c) a main body for being placed on a head of the user and supporting said image display element and said optical system, and
   (d) a control means for controlling said image display element to form an image display area and an image non-display area on said image display plane of the image display element, wherein said controlling means includes a detecting means for detecting a deviation of said main body from a standard position to derive a detection signal, a calculating means for calculating an amount of shift of the image displayed on the image display plane of the image display element, and an image converting means for converting an original image signal in accordance with said amount of shift, wherein said detecting means detects a vertical rotation of at least one of the head of the user and the main body to produce a vertical rotation signal, said calculating means calculates an amount of vertical shift over which the image displayed on the display plane of the image display element is vertically shifted in a direction opposite to a direction of the detected vertical rotation, and said image converting means converts the original image signal in accordance with said amount of vertical shift such that although the main body is deviated from the standard position, a virtual image is observed by the user to be stationary on a virtual image plane.

4. An image display apparatus according to claim 3, wherein said detecting means detects, in addition to said vertical rotation, a swinging movement of at least one of the head of the user and the main body to derive a swinging angle signal, said calculating means calculates, in addition to said amount of vertical shift, an amount of rotation angle over which the image displayed on the image display plane of the image display element is rotated in a direction opposite to a direction of said swinging movement, and said converting means converts the original image signal in accordance with said amounts of said vertical shift and rotation angle.

5. An image display apparatus of head mounted display type, comprising:
   (a) an image display element displaying an image on an image display plane, (b) an optical system for introducing said image displayed on said image display plane of the image display element into an eye of a user, (c) a main body for being placed on a head of the user and supporting said image display element and optical system, and (d) a control means for controlling said image display element to form an image display area and an image non-display area on the image display plane of said image display element, wherein said control means includes a detecting means provided on said main body for detecting a deviation of said main body from a standard position to derive a detection signal, a calculating means for calculating an amount of rotation angle of the image displayed on the image display plane of the image display element, and an image converting means for converting an original image signal in accordance with said amount of rotation angle, wherein said detecting means detects a swinging movement of at least one of the head of the user and the main body to produce a swinging angle signal, said calculating means calculates an amount of rotation angle over which the image displayed on the image display plane of the image display element is rotated in a direction opposite to a direction of the swinging movement, and said image converting means converts the original image signal in accordance with said amount of rotation such that although the main body is deviated from the standard position, a virtual image is observed by the user to be stationary on a virtual image plane.

6. An image display apparatus according to claim 5, wherein said detecting means detects, in addition to said swinging movement, a horizontal rotation of at least one of the head of the user and the main body to derive an amount of horizontal rotation, said calculating means calculates, in addition to said amount of rotation angle, an amount of horizontal shift over which the image displayed on the image display plane of the image display element is horizontally shifted in a direction opposite to a direction of said horizontal rotation, and said converting means converts the original image signal in accordance with said amounts of rotation angle and horizontal shift.

7. An image display apparatus of head mounted display type, comprising:

(a) an image display element displaying an image on an image display plane, (b) an optical system for introducing said image displayed on said image display plane of the image display element into an eye of a user, (c) a main body for being placed on a head of the user and supporting said image display element and optical system, and (d) a control means for controlling said image display element to form an image display area and an image non-display area on the image display plane of said image display element, wherein said control means comprises a detecting means provided on said main body for detecting at least one of a position and a distance of forward or backward movement of the main body, a calculating means for deriving an image size control signal from said at least one of detected position and distance such that when the main body is moved forward, a size of the image displayed on the image display plane of the image display element is increased, and when the main body is moved backward, a size of the image displayed on the image display plane of the image display element is decreased, and an image converting means for converting an original image signal in accordance with said image size control signal.

8. An image display apparatus of head mounted display type, comprising:

(a) a right eye image display element displaying a right eye image on an image display plane, (b) a left eye image display element displaying a left eye image on an image display plane, (c) a right eye optical system introducing the right eye image into a right eye of a user, (d) a left eye optical system introducing the left eye image into a left eye of the user, (e) a main body for being placed on a head of the user and supporting said right and left eye image display elements and right and left eye optical systems, and (f) a control means for electrically controlling said right and left eye image display elements to form an image display area and an image non-display area on respective image display planes of the right and left eye image display elements, wherein said controlling means comprises a detecting means provided on said main body for detecting at least one of a position and a distance of forward or backward movement of the main body, a calculating means for deriving an image position control signal from said detected at least one of position and distance such that when the main body is moved forward, the right eye image is moved leftward and the left eye image is moved rightward, and when the main body is moved backward, the right eye image is moved rightward and the left eye image is moved leftward, and an image converting means for converting an original image signal in accordance with said image position control signal.

9. An image display apparatus according to any one of claims 1–8, wherein the apparatus further comprises a liquid crystal shutter provided in a vicinity of the optical system and an optical axis along which light from surroundings is introduced into the eye of the user, and said control means controls said liquid crystal shutter in accordance with the original image signal converted by said converting means such that a part of the liquid crystal shutter corresponding to the image display area in the image display plane is made opaque and a portion of the liquid crystal shutter corresponding to the image non-display area in the image display plane is made transparent so that the user can see both the displayed virtual image and an image of the surroundings.

10. An image display apparatus of head mounted display type, comprising:

(a) an image display element displaying an image on an image display plane, (b) an optical system for introducing said image displayed on said image display plane of the image display element into an eye of a user, (c) a liquid crystal shutter provided on an optical axis along which light from surroundings is introduced into the eye of the user, and (d) control means for controlling said image display element such that when the liquid crystal shutter is changed from an opaque state into a transparent state, a size of said image display area in the image display plane of the image display element is reduced to cause said reduced image to occupy a position in said image display plane to enable said reduced image and surrounding of said display apparatus to be seen by the user with a small mutual interference.

* * * * *